United States Patent [19]

Ali et al.

[11] Patent Number: 5,082,805
[45] Date of Patent: Jan. 21, 1992

[54] GLASS BONDED FILLER COMPOSITIONS FOR SILICON CARBIDE FOAM CORE MIRRORS

[75] Inventors: Mir A. Ali, Lomita; Ronald E. Robbins, Simi Valley; Jason M. Wakugawa, Rolling Hills Estate, all of Calif.

[73] Assignee: Hughes Aircraft Company, Los Angeles, Calif.

[21] Appl. No.: 575,773

[22] Filed: Aug. 31, 1990

[51] Int. Cl.$^5$ .................... C04B 35/52; C04B 35/56
[52] U.S. Cl. .................................. 501/91; 501/88; 501/15; 501/32
[58] Field of Search .................... 501/93, 154, 87, 89

[56] References Cited

U.S. PATENT DOCUMENTS 4,256,378  3/1981  Prewo et al. ..................... 501/95
4,451,118  5/1984  Stalcup et al. ..................... 501/32
4,518,702  5/1985  Yoshida et al. ..................... 501/90

FOREIGN PATENT DOCUMENTS 2148368   7/1987  Japan .
3277562  11/1988  Japan .
1-87563   3/1989  Japan .

Primary Examiner—William R. Dixon, Jr.
Assistant Examiner—Paul Marcantoni
Attorney, Agent, or Firm—M. E. Lachman; W. J. Streeter; W. K. Denson-Low

[57] ABSTRACT

A filler composition having a coefficient of thermal expansion substantially equivalent to that of SiC foam and capable of fusing and integrally bonding to SiC foam. The filler composition is useful for bonding a surface layer to a SiC foam core for optical mirrors which are used in space applications and cryogenic detectors.

11 Claims, No Drawings

GLASS BONDED FILLER COMPOSITIONS FOR SILICON CARBIDE FOAM CORE MIRRORS

BACKGROUND OF THE INVENTION

1. Field of the Invention

The present invention generally relates to glass filler compositions and methods for their preparation and use. More particularly, the present invention relates to glass filler compositions which can be bonded to silicon carbide (SiC) foam surfaces and provide surfaces suitable for the deposition of additional SiC materials.

2. Description of Related Art

Lightweight mirrors having suitable reflective surfaces are frequently utilized in space-based optical systems. Such optical systems require mirrors which are resistant to distortion caused by gravitational sag effects. Due to its low density, high stiffness and excellent polishability, SiC foam is particularly suitable for these applications. Lightweight SiC foam in the form of mirrors is also useful in cryogenic optical systems where the low heat capacity of SiC foam aids in cooling and maintaining the mirrors at cryogenic temperatures.

Typically, SiC foam is prepared by depositing a layer of SiC, using chemical vapor deposition techniques, onto a carbon foam substrate. After the SiC layer is deposited, the carbon foam is removed pyrolytically to leave a monolithic SiC foam core. To provide a densified SiC surface for the application of polishable SiC material, a thin layer of SiC cement is then normally applied over the foam. This forms a laminated facesheet which acts as a substrate for the final thin coating of polishable chemical vapor deposited SiC. The thin layer of SiC is then machined, polished and, at times coated with a reflective thin film, to provide a reflective mirror surface having the desired optical quality. Light weight mirrors comprising SiC foam cores with SiC cement facesheets are described in U.S. Pat. No. 4,856,887.

Such SiC foam core mirrors must have facesheets which withstand continual temperature cycling between ambient and cryogenic temperatures and in some instances elevated temperatures. In considering the demands for dimensional stability at a variety of temperatures, at the least, the facesheet material and the SiC foam must have coefficients of thermal expansion which are identical. Additionally, the facesheet material preferentially forms a strong bond to the SiC foam to decrease the possibility of delamination during temperature cycling and a subsequent loss in the facesheet optical quality.

One problem with prior SiC cement facesheets is their tendency to delaminate from the SiC foam core because the SiC cement and SiC foam core are not sufficiently bonded together. Accordingly, there is a need to provide materials for SiC facesheets which will integrally bond to the SiC foam core. There is additionally a need to provide materials for SiC facesheets with a substantially equivalent coefficient of thermal expansion as the SiC foam mirrors.

SUMMARY OF THE INVENTION

The present invention is directed to filler compositions which can be applied to the surface of SiC foam substrates, ground to a smooth surface, and finally fired to form a highly fused surface layer which is integrally bonded to the SiC foam substrate. Further, the filler compositions of the present invention are well suited for application to SiC foam cores for mirrors used in optical systems. The filler compositions of the present invention and SiC foam substrates have substantially equivalent coefficients of thermal expansion which contribute to an enhanced dimensional stability and thermal integrity for the SiC foam mirror over a wide temperature variation.

The filler compositions of the present invention comprise a glass powder, a SiC powder, a boron carbide powder, an organic binder, and deionized water. These filler compositions can be prepared by methods known in the art using a variety of powders having fine particle sizes and varying amounts of water and organic binder to control its consistency and its grinding characteristics.

In accordance with the teachings of the present invention, the filler compositions can be applied to SiC foam substrates using known methods including brushing, spraying, spin coating, and dipping. Typically, the coated SiC foam substrate is air dried at ambient conditions and then ground using progressively finer grit SiC abrasive paper. The coated SiC foam substrate is then heated to a temperature which is sufficient to burn off the organic binder and finally fired at the glass fusion temperature of the glass powder to form a fused and integrally bonded surface layer.

The resulting coated SiC foam substrate prepared from the filler compositions of the present invention has a very smooth surface and possesses an enhanced dimensional integrity and thermal stability. SiC foam mirrors prepared from the coated foam substrate are suitable for use in optical systems for applications which demand lightweight materials at both cryogenic temperatures and elevated temperatures.

The above-discussed and many other features and attendant advantages of the present invention will become apparent as the invention becomes better understood by reference to the following detailed description.

DESCRIPTION OF THE PREFERRED EMBODIMENTS

The filler compositions of the present invention are particularly well suited for use in connection with forming thin fused layers which can be bonded on the surface of SiC foam. However, it will be understood that the principles and teachings of the present invention are equally well suited for use in other similar applications where a hardened, fused and bonded surface layer is required. Accordingly, for purposes of explanation and without limiting the scope of the present invention, the following exemplary embodiments will be discussed in the context of filler compositions for impregnating and bonding to the surface of SiC foams.

The filler compositions of the present invention are particularly well suited for use in procedures for forming thin densified layers known as facesheets on the surface of SiC foam cores used for mirrors. Such procedures and the materials used to perform the procedures are known in the art and typically consist of applying a layer of SiC cement to the SiC foam substrate surface and curing the cement in place. The present invention is intended as an improvement upon such procedures and materials.

As will be discussed below, the filler compositions of the present invention are especially well suited for application to SiC foam substrates wherein it is advantageous for the substrate and the surface layer to have substantially equivalent coefficients of thermal expansion and the surface layer is integrally bonded to the SiC foam substrate.

The filler composition of the present invention comprises a glass powder, SiC powder, a boron carbide powder, an organic binding material, and water. The relative amounts of each component present in the filler composition is dependent upon the desired final consistency and particle size distribution of the powders. Typically the glass powder comprises from about 7 to about 10 weight percent of the composition. The SiC powder comprises from about 35 to about 45 weight percent, and the boron carbide powder comprises from about 1 to about 5 weight percent of the total weight of the composition. The organic binder and water can vary considerably to provide the desired flow characteristics and can be present from about 25 to about 35 weight percent and from about 15 to about 25 weight percent, respectively.

Additionally, the particle size and the particle size distribution of the glass powder, the SiC powder, and the boron carbide powder each contribute to the final flow properties of the filler composition. As discussed below, these flow properties relate to consistency, and the preferred consistency is partially dependent upon the method utilized to apply the filler composition to the substrate. For a wide variety of application procedures, however, the preferable mesh size of each powder is about 400. This corresponds to a particle size of below 25 microns. The particle size distribution is preferably from about 10 to about 20 microns.

The glass powder is preferably a material having a coefficient of thermal expansion substantially equivalent to that of the SiC foam. Additionally, the glass preferably has a fusion temperature of from about 1200° C. to about 1350° C. These combined properties serve the dual purpose of providing a strong bond between the glass and the SiC and enhancing the thermal integrity of the bond by matching thermal properties of the glass and the SiC. An exemplary glass powder includes $SiO_2$, $Al_2O_3$, $Li_2O$, $TiO_2$, and $MgO$, as described in U.S. Pat. No. 3,246,972, the contents of which ar hereby incorporated by reference. Preferred glass powders have the following composition, expressed in weight percent of the total composition:

| Oxide | Weight Percent |
|---|---|
| $SiO_2$ | 72–77 |
| $Al_2O_3$ | 15–18 |
| $LiO_2$ | 3–5 |
| $MgO$ | 0.1–1.5 |
| $TiO_2$ | 0.1–3.0 |

The predominant filler material utilized in the filler composition of the present invention is SiC powder. The presence of the SiC component in the filler composition provides a chemical and thermal compatibility with the SiC foam substrate and contributes to the structural continuity of the SiC foam substrate.

The filler compositions of the present invention utilize boron carbide powder which acts as a sintering aid and is present in a relatively small amount. In this capacity it participates in the bonding process wherein a high temperature integral bond is formed between the SiC powder and the SiC foam substrate.

The organic binder utilized in the filler composition of the present invention is readily soluble in water and acts as a surfactant for the powder components of the composition. As such, the final formulated filler composition is a homogeneous suspension of water insoluble powders which is capable of being sprayed or brushed onto a foam substrate. Additionally, the organic binder provides the basic ambient temperature strength and physical integrity to the filler compositions of the present invention. When used and formulated in conjunction with water, the consistency and flow properties of the filler composition can be tailored to meet the requirements for the mode of applying the filler composition to the substrate. Preferably the organic binder has a burn-off temperature of between about 350° C. to 600° C. This characteristic allows the organic binder to vaporize at elevated temperatures without leaving a residue. Exemplary organic binders include a tertiary amide polymer binder, methyl cellulose, or Gum Arabic.

Water which is utilized in the filler compositions of the present invention is preferably deionized and double distilled water. This level of water treatment assures that unwanted and unnecessary organic and inorganic contaminants are kept at a very low level and do not interfere with the fusing process.

The filler composition of the present invention can be prepared by methods currently known in the art, including techniques for combining the liquid components, milling the powders, and mixing all the components to the desired consistency. The prepared filler composition can then be applied to a foam substrate, dried until a hardened surface is formed and ground to a smooth surface. The coated foam substrate is then fired to bond the glass.

In accordance with the present invention, prepared filler compositions are capable of impregnating and bonding to SiC foam substrates to form an integrally bonded coating with substantially the same coefficient of thermal expansion as the SiC foam substrate. Additionally, the coating can be polished to form a highly reflective surface. Accordingly, the filler compositions are preferably used to coat SiC foam substrates in the form of foam cores for mirrors used in optical systems for space applications and for cryogenic detectors. The extreme temperature variations experienced by SiC foam mirrors in these applications require a high degree of thermal integrity between the surface coating and the foam substrate, which is supplied by the filler compositions of the present invention.

Methods known in the art for forming a fused glass coating layer bonded on a foam substrate can be utilized in the practice of the present invention. Such methods include the steps of preparing the filler composition comprising the glass powder, SiC powder, boron carbide powder, organic binder, and water as described above and then applying the filler composition to one or more surfaces of the substrate. As described below, the filler composition can be applied to the surface of the SiC foam substrate using techniques known in the art, including both spraying and brushing methods.

Following the application step, the filler coating on the SiC foam substrate is dried at approximately 25° C. and then dried at progressively higher temperatures up to 100° C. for approximately 40 hours. This step results in a hardened surface which can be effectively polished using dry grinding techniques and progressively finer grit SiC paper. The total grinding and polishing step requires up to 16 hours to perform, depending upon the sample size and the method of polishing.

Following the polishing step, the coated SiC foam substrate is typically fired in a suitable furnace at a temperature which is sufficiently high to burn off all organic components of the composition. In practical terms this is the temperature at which the organic binder is decomposed and vaporized, and normally occurs at less than 700° C. Then the coated SiC foam substrate is fired at a temperature and for a length of time which is sufficient to fuse the glass powder and bond the SiC powder and glass powder to the SiC foam substrate. The preferred temperature depends upon the glass fusion temperature of the glass, but typically the temperature is between 1200° C. and 1350° C. One hour is normally sufficient for the fusing and bonding process to occur. Finally the coated substrate is annealed in a furnace at a suitable annealing temperature for several hours to remove internal stresses formed as a result of the high firing temperatures.

In accordance with the present invention the, resulting coated SiC foam substrate can be further processed by application of a chemical vapor deposition (CVD) coating of SiC. This thin (CVD) layer of SiC reinforces the underlying SiC layer and is also a polishable surface which can be further machined and polished to the desired optical quality.

As mentioned above, the filler compositions of the present invention are capable of impregnating the surface of SiC foam substrates to form an impervious surface which can be ground to a smooth surface. Effective methods for applying the filler compositions to achieve the uniformally covered and impregnated substrate surface include brushing, spraying, spin coating, and dipping. These procedures are known in the art and are generally applicable for applying the filler compositions of the present invention. Variations in the water content and organic binder content as well as small adjustments in the particle size distribution of the powders may be necessary to tailor the flow properties to the method of choice for applying the composition. For example, spraying techniques typically require that the filler composition be freely flowing. This contrasts with brushing methods which can be used to apply filler compositions with a paste consistency.

By way of illustration only, the following example describes a method for preparing the filler composition of the present invention, brush coating the prepared filler composition onto a foam substrate, and bonding the filler composition to a SiC foam substrate. The example also illustrates the enhanced surface quality of the SiC foam substrate following the bonding process. The example further illustrates an integrally bonded and polished surface.

EXAMPLE

A filler composition useful for application to SiC foam substrates was prepared by dissolving 23 grams of organic binder, CIMAREC brand ceramic binder (formerly XUS-40303), a tertiary amide polymer binder, available from Dow Chemical Company, in 16 grams of deionized water. The mixture was allowed to sit for 24 hours to dissolve and the resulting solution had a pale yellow appearance with a honey-like consistency.

A mixture consisting of 33 grams of SiC powder of approximately 400 mesh, 7 grams of glass powder of approximately 400 mesh, and 2 grams of boron carbide of approximately 400 mesh was transferred to a milling jar. The glass power had the composition set forth in U.S. Pat. No. 3,246,972, previously referenced, using item 7 of Table 3, which comprised 70% petalite and 30% lithia-alumino-silicate glass. The latter was selected to have the composition set forth in item 6 of Table I of U.S. Pat. No. 3,246,972. Seven $Al_2O_3$ ¼" milling balls were placed in the jar and the powders were dry mixed in a roller mill for approximately four hours.

The powders were then removed from the milling jar and the solution of water and organic binder was gradually added to the milled powder mixture. The composition components were thoroughly mixed using a hand mixing technique and a stainless steel spatula. After ten minutes of continual mixing the resulting thick homogeneous filler composition was ready for application to the surface of a SiC foam substrate. The composition of the present invention used in this example comprised, before firing, on the basis of weight percent of the composition: 40.6% SiC; 8.6% glass; 2.5% $B_4C$; 28.3% organic binder; and 20.0% water.

Several 1-inch (2.54-cm) thick pieces of SiC foam obtained from Superior Graphite Company of Chicago, Ill. as HSC077 SiC (beta phase) were degreased using conventional degreasing techniques. A scanning electron micrograph of a representative piece of degreased SiC foam at 50X was obtained prior to application of the prepared filler composition.

A 1-inch (2.54-cm) wide EMRO 100% bristle No. 54 brush was utilized for applying the filler composition to the surface of the SiC foam substrate. Preliminarily, the brush was soaked in the filler composition for a time period sufficient to wet the dry brush bristles. Using both forward and backward stroking techniques the filler composition was applied until the foam surface pores appeared to be filled.

The first coating on the SiC foam substrate was allowed to air dry at about 25° C. for one hour. A second coat was then applied in the same manner as the first application procedure and the second coating on the substrate was allowed to air dry for 24 hours at approximately 25° C.

Following the second drying step the coated SiC foam substrate surface was polished over a series of progressively finer grits of SiC polishing paper in the following order: 220 grit, 320 grit, 400 grit, and 520 grit. Upon microscopic examination, it was determined that this polishing technique tended to break the half pores. A third coating was then applied in the same manner as described above using a very soft, heavily bristled brush. The coated substrate was then allowed to dry at approximately 25° C. for eight hours. Optionally, the surface of the third coating layer can be quickly polished with a 500 grit SiC paper to smooth observable surface irregularities.

A final oven drying procedure was then applied to the coated SiC foam substrate. This procedure comprised heating approximately 6 hours at 30° C.; 15 hours at 50° C.; 8 hours at 75° C.; and 8 hours at 100° C. The resulting substrate was extremely hard and could be effectively dry ground and polished to a smooth surface. The final polishing procedure utilized progressively finer SiC grit ranging from 100 grit to 500 grit and required up to 16 hours of polishing time.

The coated, dried, and polished SiC foam substrate was then fired in an electrically heated tube furnace using a positive flow of ultra pure argon gas. A low temperature of approximately 600° C. for one hour was maintained to burn off the organic binder, followed by a rapid increase to 1250° C. for approximately one hour to fuse the glass and bond the coating to the SiC foam. The furnace temperature was then lowered to 600° C. for approximately one hour to anneal the SiC foam pieces.

A scanning electron micrograph of the coated and bonded SiC foam substrate was prepared at 200X. When compared with the 50X micrograph of the foam substrate, the surface smoothness is exceptionally noticeable.

The final coated, polished, and fired SiC foam substrate was then CVD coated with a thin layer of SiC. A scanning electron micrograph of the bonded and CVD coated SiC foam was obtained to observe the final surface morphology. The result is a highly reflective surface with no irregularities.

The filler compositions of the present invention can be applied to SiC foam substrates and subsequently fired to fuse the glass filler and integrally bond the filler composition to the SiC foam surface. The scanning electron micrographs indicate that the coated surface layer of the SiC foam substrate is integrally bonded to the foam. At a 50X magnification there are no observable voids between the fused and bonded layer and the foam substrate. Since the fused glass incorporated in the filler composition has a coefficient of thermal expansion substantially equivalent to that of the substrate, the final bonded substrate possesses dimensional stability over a wide temperature range.

The scanning electron micrographs illustrate a surface bonded substrate with a smooth surface profile which is suitable for use as mirrors in optical systems. Due to the low density of the SiC foam and the thermal stability of the surface bonded foam, mirrors prepared with the filler composition of the present invention are particularly well suited for use in cryogenic applications. Such uses include mirrors for long wavelength infrared sensors. Mirrors prepared with the filler composition of the present invention are also useful for visible sensors operating at room temperature.

Having thus described preferred exemplary embodiments of the present invention, it should be noted by those skilled in the art that the disclosures herein are exemplary only and that alternate adaptations and modifications may be made within the scope of the present invention. Accordingly, the present invention is not limited to the specific embodiments illustrated herein, but is only limited by the following claims.

What is claimed is:

1. A filler composition useful for application to a SiC foam substrate, said filler composition comprising:
   from about 35 to about 45 weight percent SiC powder;
   from about 1 to about 5 weight percent boron carbide powder;
   from about 7 to about 10 weight percent glass powder, said glass powder having a coefficient of thermal expansion substantially equal to said SiC foam, and comprising:
   from about 72 to about 77 weight percent silicon dioxide;
   from about 15 to about 18 weight percent aluminum oxide;
   from about 3 to about 5 weight percent lithium oxide;
   from about 0.1 to about 1.5 weight percent magnesium oxide; and
   from about 0.1 to about 3.0 weight percent titanium dioxide;
   from about 25 to about 35 weight percent organic binder, said binder having a burn-off temperature range of 3502 C. to 600° C.; and
   from about 15 to about 25 weight percent water.

2. The filler composition of claim 1 wherein said SiC powder, said boron carbide powder, and said glass powder have a mesh size of approximately 400.

3. The filler composition of claim 1 wherein said glass powder has a glass fusion temperature of from about 200° C. to about 1350° C.

4. The filler composition of claim 1 wherein said organic binder is selected from the group of water soluble binders consisting of a tertiary amide polymer, methyl cellulose, and Gum Arabic.

5. The filler composition of claim 1 wherein said water is deionized and double distilled.

6. The filler composition of claim 1 wherein the amount of SiC powder present in the composition is about 40 weight percent.

7. The filler composition of claim 1 wherein the amount of boron carbide powder present in the composition is about 2 weight percent.

8. The filler composition of claim 1 wherein the amount of glass powder present in the composition is about 8 weight percent.

9. The filler composition of claim 1 wherein the amount of organic binder present in the composition is about 28 weight percent.

10. The filler composition of claim 1 wherein the amount of water present in the composition is about 19 weight percent.

11. A filler composition useful for application to a SiC foam substrate, said filler composition comprising:
   40.6 weight percent SiC powder having a 400 mesh size;
   2.5 weight percent boron carbide powder having a 400 mesh size;
   8.6 weight percent glass powder having a 400 mesh size, said glass powder having a coefficient of thermal expansion substantially equal to said SiC foam and a glass fusion temperature of from 1200° C. to 1350° C.;
   28.3 weight percent organic binder having substantial water solubility, said organic binder having a burn-off temperature range of from 350° C. to 600° C.; and
   20.0 weight percent water.

* * * * *

UNITED STATES PATENT AND TRADEMARK OFFICE
CERTIFICATE OF CORRECTION

PATENT NO. : 5,082,805

DATED : January 21, 1992

INVENTOR(S) : MIR A. ALI, RONALD E. ROBBINS, and JASON M. WAKUGAWA

It is certified that error appears in the above-identified patent and that said Letters Patent is hereby corrected as shown below:

Col. 3, line 49, delete "$LiO_2$" and insert therefor --$Li_2O$--.

Col. 8, line 13, Claim 1 delete "3502 C" and insert therefor --350°C--.

Col. 8, line 20, Claim 3 delete "200°C" and insert therefor --1200°C--.

Signed and Sealed this

Eleventh Day of January, 1994

Attest:

BRUCE LEHMAN

Attesting Officer     Commissioner of Patents and Trademarks